United States Patent
Stitelman et al.

(10) Patent No.: US 10,129,595 B2
(45) Date of Patent: *Nov. 13, 2018

(54) METHODS AND APPARATUS FOR DEFINING AN AUDIENCE FOR A PARTICULAR LOCATION BY SURVEYING NEARBY RECEIVERS AND/OR PASSIVELY MONITORING CONTENT CONSUMPTION

(71) Applicant: Dstillery, Inc., New York, NY (US)

(72) Inventors: Ori Stitelman, Livingston, NJ (US); Blake Aber, Darien, CT (US); Andrew Pancer, Glen Rock, NJ (US); Rodney Hook, New York, NY (US); Brian Dalessandro, Brooklyn, NY (US)

(73) Assignee: Dstillery, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,016

(22) Filed: Apr. 21, 2017

(65) Prior Publication Data

US 2017/0230715 A1    Aug. 10, 2017

Related U.S. Application Data

(63) Continuation of application No. 15/042,697, filed on Feb. 12, 2016, now Pat. No. 9,635,422.

(60) Provisional application No. 62/115,546, filed on Feb. 12, 2015.

(51) Int. Cl.
*H04H 60/32* (2008.01)
*H04N 21/466* (2011.01)
*H04H 60/33* (2008.01)
*H04N 21/2668* (2011.01)
*H04N 21/442* (2011.01)
*H04N 21/414* (2011.01)

(52) U.S. Cl.
CPC ........ *H04N 21/4667* (2013.01); *H04H 60/33* (2013.01); *H04N 21/2668* (2013.01); *H04N 21/41407* (2013.01); *H04N 21/44204* (2013.01); *H04N 21/44222* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0089288 A1* | 4/2008 | Anschutz | ............... | G06Q 30/02 370/331 |
| 2009/0197616 A1* | 8/2009 | Lewis | .................... | G06Q 30/02 455/456.1 |
| 2009/0298514 A1* | 12/2009 | Ullah | ........................ | G01S 5/02 455/456.5 |

(Continued)

*Primary Examiner* — Mulugeta Mengesha
(74) *Attorney, Agent, or Firm* — Cooley LLP

(57) ABSTRACT

Some embodiments described herein relate to a method that includes surveying and/or passively monitoring content consumption by mobile communication devices. Each signal received from a mobile communication device can be associated with a common location. For example, an out-of-home device positioned at the location can be operable to receive requests from mobile communication devices that represent requests to access network locations. An audience profile for that common location can be defined based on a network location that is identified as being statistically overrepresented. Content targeted to the audience profile at the common location can then be provided.

27 Claims, 4 Drawing Sheets

(56) References Cited

U.S. PATENT DOCUMENTS

2012/0327826 A1\* 12/2012 Lin ..................... H04W 4/001
                                                    370/310
2015/0095124 A1\* 4/2015 Felt ................... G06Q 30/0259
                                                    705/14.5

\* cited by examiner

200

METHODS AND APPARATUS FOR DEFINING AN AUDIENCE FOR A PARTICULAR LOCATION BY SURVEYING NEARBY RECEIVERS AND/OR PASSIVELY MONITORING CONTENT CONSUMPTION

CROSS-REFERENCE TO RELATED APPLICATION

This application is a continuation of U.S. patent application Ser. No. 15/042,697, filed Feb. 12, 2016, which claims priority to U.S. Provisional Application Ser. No. 62/115,546, entitled "Methods and Apparatus for Defining an Audience for a Particular Location by Surveying Nearby Receivers and/or Passively Monitoring Content Consumption," filed Feb. 12, 2015, the disclosure of each of which is hereby incorporated by reference in its entirety.

BACKGROUND

Some embodiments described herein relate generally to methods and apparatus for defining an audience for a particular location. For example, some embodiments described herein relate to an out-of-home device surveying nearby receivers and passively monitoring content, such as programs, channels, websites, etc., consumed by the user of the receiver.

As computing power and Internet connectivity increases, new roles for digital devices are constantly emerging. One recent development has been the rise in digital out-of-home devices, which can provide dynamic and/or custom content to passersby. For example, building directories, gas-pump information displays, billboards, airplane seat-back displays, taxi information placards and so forth are rapidly being digitized and/or adding functionalities. At the same time, big data techniques are being used to build increasingly sophisticated and granular profiles of the general public. To date, however, the ability to develop audience profiles for compact public locations, such as the area surrounding an out-of-home device, has been limited. A need therefore exists for methods and apparatus for defining an audience for a particular location by surveying receivers, such as mobile communication devices, near an out-of-home device and passively monitor content consumed by the user using the mobile communication device and/or a related computing entity.

DETAILED DESCRIPTION

Figure 1:
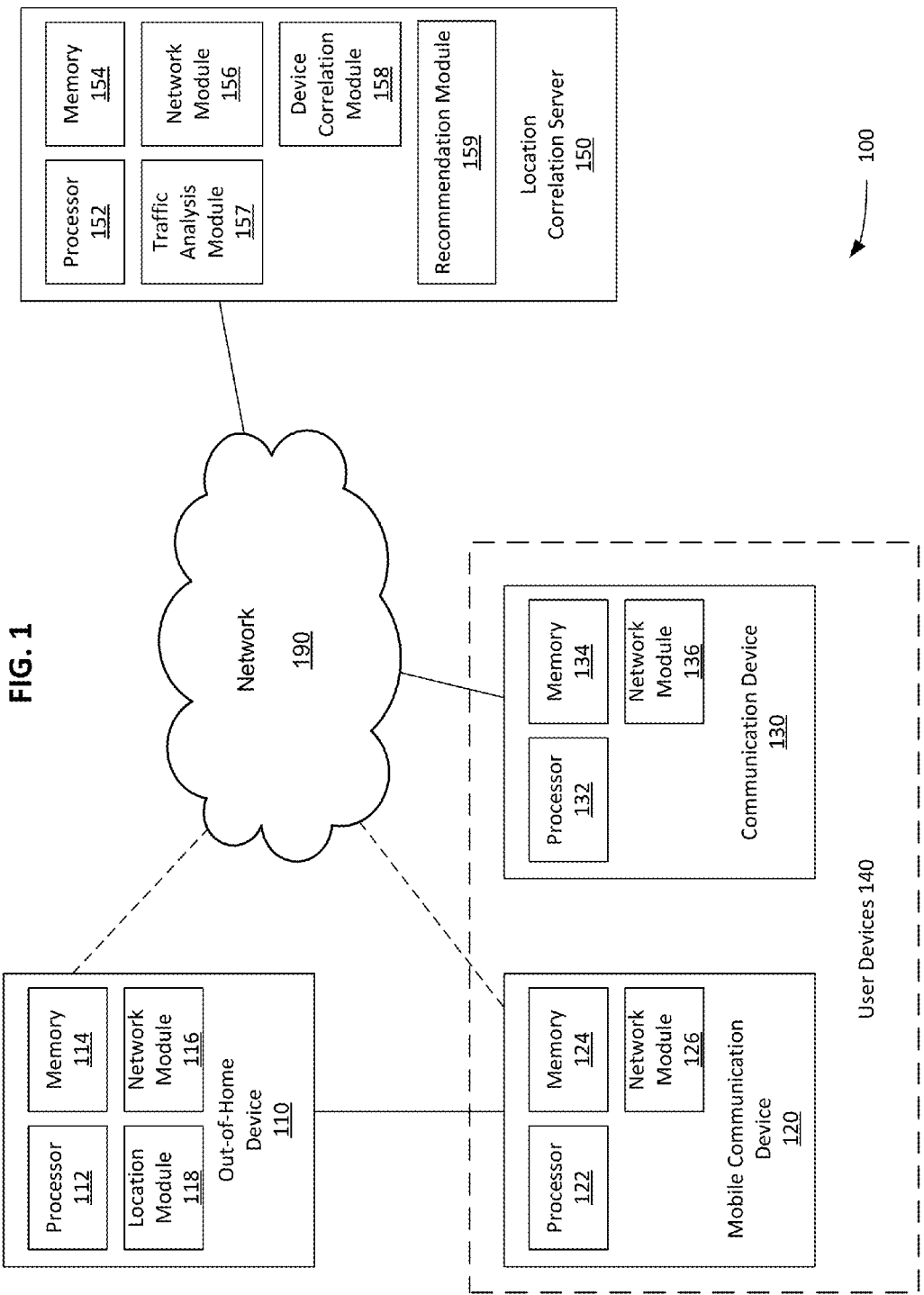
FIG. 1 is a schematic diagram of a system for dynamically defining an audience, according to an embodiment.

Content providers have long sought to increase the effectiveness and relevance of content available to content consumers. In the pre-Internet era, traditional media outlets might target content to an audience based on crude demographic information. For example, when engaging in a traditional billboard advertising campaign, the advertiser might consider the demographics of the neighborhood containing the billboard. Such pre-Internet methods were constrained to relatively imprecise targeting due to its dependence on relatively unsophisticated information about the audience, such as age, sex, and so forth.

The rise of the Internet has created new opportunities for monitoring media consumption and targeting additional content to users based on such consumption. Conventionally, content has generally been targeted based on interests inferred from content consumed by a particular user or a particular device. A need exists for highly-specific location-based audience profiles to facilitate unconventional targeting of content can be targeted based on specific and relatively small locations. In some embodiments described herein out-of-home devices and/or mobile communication devices can be treated similar to sensors reporting content consumption patterns for a particular location. Thus, a location-based audience profile can be developed and used to target content to other users associated with that location. In this way, users who may not otherwise have been identified as having an affinity for a particular type of content can be targeted based on their presence in a location linked to that type of content.

Some embodiments described herein relate to out-of-home devices that can be used to monitor content consumed by users at a particular location. Such content consumption patterns can then be used to define an audience profile for that location. In this way, highly granular audience profiles can be developed. For example, an out-of-home device can be operable to detect Wi-Fi signals having a range of approximately 200 feet to monitor content consumption patterns for a location. Thus, an audience profile for an area of approximately 150,000 square feet (e.g., an area having a radius of approximately 200 feet) can be defined. Then, content can be targeted to that location based on the audience profile. In some instances, such location-based targeted content can be delivered to users at the location via the out-of-home device. For example, an electronic billboard at the location can be populated based on the audience profile, user devices accessing a network location via a network access point at the location can be served content based on an identifier of the network access point, and so forth.

Some embodiments described herein relate to an apparatus that can include a device correlation module. The device correlation module can be implemented in hardware and/or software (e.g. stored on a memory and/or executing on a processor). The device correlation module can be configured to define associations between user devices, such as a mobile communication device and a communication device. Such an association can be defined, for example, based on an indication of network activity associated with the communication device (e.g., the communication device accessing a webpage, logging into a user account, etc.) and an indication of network activity associated with a mobile communication device. The indication of network activity associated with the mobile communication device can be detected by and/or received from an out-of-home device. In some instances, the out-of-home device can provide network access to the mobile communication device. The apparatus can also include a traffic analysis module implemented in hardware and/or software (e.g. stored on a memory and/or executing on a processor). The traffic analysis module can be configured to receive an indication of a location associated with the out-of-home device and a network log from the out-of-home device. The network log can identify network locations accessed by user devices, (e.g., including the mobile communication device). The traffic analysis module can be operable to identify a network location that is statistically overrepresented in the network log. The apparatus can further include a recommendation module. The recommendation module can be implemented in hardware and/or software (e.g. stored on a memory and/or executing on a processor). The recommendation module can be operable to define an audience profile for the location based on the statistically overrepresented network location. In some instances, content can be sent to the out-of-home device based on the audience profile. Such content can be displayed at the location (e.g., via the out-of-home device and/or a user device). For example, in an instance where the out-of-home device is or includes an electronic billboard, the electronic billboard can be populated with content based on the audience profile for the location. As another example, in an instance where the out-of-home device is or includes a network access point, communication devices connected to the out-of-home device can be served content based on the audience profile.

Some embodiments described herein relate to a method (optionally a computer-implemented method) that includes receiving indications of network activity associated with mobile communication devices. An indication of a common location for each indication of network activity can also be received. For example, an out-of-home device can be operable to monitor network activity engaged in by multiple mobile communication devices. In addition or alternatively, an indication that a mobile communication device accessed a network location can be received from that network location, from an Internet service provider (ISP), and/or from the mobile communication device itself. An indication of general network activity, such as Internet traffic data provided by Alexa™ or other analytics provider can be received. The general network activity can, for example, reflect network activity initiated by a general population such as users of the Internet at large. Similarly stated, the general network activity may reflect or represent all visits to one or more network locations and/or may be independent of any particular location. A network location that is statistically overrepresented the network activity associated with the mobile communication devices relative to the general network activity can be identified. An audience profile for a location associated with the out-of-home device can be defined based on the statistically overrepresented network location. Content can be sent to the out-of-home device, a mobile communication device detected by the out-of-home device, and/or communication device that is linked to a mobile communication device detected by the out-of-home device based on the audience profile.

Some embodiments described herein relate to a method (optionally a computer-implemented method) that includes receiving signals representing requests to access network locations from mobile communication devices. Each signal received from a mobile communication device can be associated with a common location. For example, an out-of-home device positioned at the location can be operable to receive requests from mobile communication devices that represent requests to access network locations. An audience profile for that common location can be defined based on a network location that is identified as being statistically overrepresented. Content targeted to the audience profile at the common location can then be provided.

FIG. 1 is a schematic diagram of a system 100 for dynamically defining an audience, according to an embodiment. The system 100 includes an out-of-home device 110 and a location correlation server 150. The system 100 also includes user devices 140, including a mobile communication device 120 and a communication device 130. A network 190 can communicatively couple any device of the system 100 to any other device. The network 190 can be any communication network or combination of networks capable of transmitting information (e.g., data and/or signals) and can include, for example, the Internet, an intranet, a telephone network, an ethernet network, a fiber-optic network, a wireless network, and/or a cellular network.

The mobile communication device 120 can be any suitable computing entity, such as a smart phone, tablet computer, laptop computer, desktop computer, etc. The mobile communication device 120 can be a personal-use computing device such as a device owned by an individual citizen (e.g., as distinct from the out-of-home device 110, described in further detail herein, which may be provided by a business to provide content to customers of the business and/or bystanders). The mobile communication device 120 can be a receiver for content such as streaming video, Internet activity, broadcast television, etc.

The mobile communication device 120 includes a processor 122 and a memory 124. The processor 122 can be for example, a general purpose processor, a Field Programmable Gate Array (FPGA), an Application Specific Integrated Circuit (ASIC), a Digital Signal Processor (DSP), and/or the like. The processor 122 can be configured to retrieve data from and/or write data to memory, e.g., the memory 124, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. The network module 126 can be a wired and/or wireless transmission module operable to communicatively couple the mobile communication device to the network 190. For example, the network module 126 can be a wired and/or wireless network interface controller (NIC), a cellular telephone module, a Bluetooth® module, a ZigBee® module, ultrasonic, magnetic and/or any other suitable module configured to send and/or receive signals via the network 190.

The communication device 130 can be any suitable computing entity, such as a smart phone, tablet computer, laptop computer, desktop computer, etc. The communication device 130 includes a processor 132, a memory 134, and a network module 136, which can be structurally and/or functionally similar to the processor 122, the memory 124, and/or the network module 126, respectively, as shown and described above. As described in further detail herein, the communication device 130 and the mobile communication device 120 can be associated with each other and collectively referred to as user devices 140. In some instances, the mobile communication device 120 can be a smart phone and the communication device 130 can be a desktop or laptop computer owned by a common user. In some instances, the mobile communication device 120 may have been detected or surveyed by the out-of-home device 110, while the communication device 130 may not have been detected or surveyed by the out-of-home device 110. In addition or alternatively, the mobile communication device 120 can be operable to report its location to the location correlation server 150. In addition or alternatively, the location server 150 can ascertain the location of the mobile communication device 120 when the mobile communication device 120 connects to an ISP, content server, or other suitable device (not shown in FIG. 1) via the network 190.

The out-of-home device 110 can be computing entity having a processor 112 and a memory 114, which can be structurally and/or functionally similar to the processor 122 and/or the memory 124, respectively, described above. In some embodiments, the out-of-home device 110 can operable to present custom and/or dynamic content to customers of a business and/or bystanders. For example, the out-of-home device 110 can be a taxi seat-back display operable to display driving directions, fare information, information about local attractions, product announcements, news, entertainment, etc. As another example, the out-of-home device 110 can be an electronic building or shopping center directory, gas pump display, airline seatback display, electronic billboard, and so forth. As described in further detail herein, the out-of-home device 110 can be configured to detect and/or record the presence of nearby mobile communication devices (e.g., the mobile communication device 120) and can present custom and/or dynamic content for the user of the mobile communication device 120 and/or can present content based on patterns of nearby mobile communication devices.

The network module 116 can be operable to survey and/or detect nearby communication devices (e.g., communication devices within 50 feet, 100 feet, 250 feet, 400 feet, or any other suitable distance). For example, in some embodiments, the out-of-home device 110 can provide a Wi-Fi hotspot, and the network module 116 can enable communication devices (e.g., the mobile communication device 120) to connect to the out-of-home device 110. FIG. 1 illustrates the mobile communication device 120 connected to the out-of-home device 110. When a connection is established between the mobile communication device 120 and the out-of-home device 110, the mobile communication device 120 can be referred to as a connected mobile communication device 120.

The out-of-home device 110 can provide connected mobile communication devices access to the network 190. Similarly stated, in such an embodiment, when the mobile communication device 120 connects to the network 190 via the out-of-home device 110, the network module 116 can transfer data from the mobile communication device 120 to the network 190 and vice versa. Thus, in such an embodiment, the mobile communication device 120 may not be coupled to the network 190 via a cellular data link or other connection. The network module 116 can also be operable to analyze the traffic requested by the mobile communication device 120 and/or store identifiers associated with the mobile communication device 120, such as Media Access Control (MAC) address, user agent, and/or any other suitable information associated with establishing a WiFi connection and/or embedded in traffic passing to or from the connected mobile communication device 120.

In other embodiments, the network module 116 can be a Bluetooth® module operable to "ping" and/or identify nearby communication devices, a cellular radio module (e.g., the out-of-home device 110 can be or include a micro- or pico-cellular base station), or any other suitable module configured to send signals to and/or receive signals from the mobile communication device 120 and/or the network 190. The network module 116 can actively request identification information (e.g., Universally Unique Identifier (UUID), MAC address, etc.) from nearby mobile communication devices and/or may passively monitor ("sniff") data sent to and/or received from mobile communication device 120 (e.g., when the mobile communication device 120 is connected to the network 190 via a cellular data link or other network access point) to detect identification information.

The out-of-home device 110 can also include a location module 116, which can be a GPS module or any other suitable hardware and/or software (e.g., executing on a processor) module operable to determine the location of the out-of-home device 110. For example, in instances where the out-of-home device 110 is a mobile device (e.g., a taxi seatback display) the location module 118 can be operable to monitor the location of the out-of-home device 110 as the out-of-home device 110 moves. In other embodiments, for example where the out-of-home device 110 is stationary (e.g. a billboard on a bus shelter), the out-of-home device 110 may not include the location module 118. In such an instance, the location of the out-of-home device 110 can be stored in the memory 114 of the out-of-home device 110 and/or the memory 154 of the location correlation server 150. In some instances, the out-of-home device 110 can provide location services, such as mapping information, nearby restaurants or other points of interest, and so forth to the audience of the out-of-home device and/or the connected mobile communication device 120 based on the location determined by the location module 116 and/or stored in the memory 114, 154.

The location correlation server 150 is a computing entity that includes a processor 152, a memory 154, and a network module 156, each of which may be structurally and/or functionally similar to the processor 122, the memory 124, and/or the network module 126, respectively, as shown and described above. The location correlation server 150 further includes a traffic analysis module 157, a device correlation module 158, and a recommendation module 159.

The device correlation module 158 can be operable to define associations between communication devices, such as the mobile communication device 120 and the communication device 130. The mobile communication device 120 and the communication device 130 are collectively referred to as user devices 140. Similarly stated, the mobile communication device 120 and the communication device 130 can be related to each other through a user. For instance, the mobile communication device 120 and the communication device 130 can be owned and/or used by a common individual, or can be owned and/or used by related individuals (e.g., spouses, parent and child, friends, coworkers, etc.). In other instances, the user devices 140 can be owned and/or used by two individuals, who may or may not be aware of each other, based on the users having similar habits, patterns, demographics, etc. The device correlation module 158 can define an association for the user devices 140 using any suitable model or technique. Prior to the device correlation module 158 defining the association for the user devices 140, the out-of-home device 110 and/or the location correlation server 150 may not have any record or information relating to a relationship existing between the mobile communication device 120 and the communication device 130.

The traffic analysis module 157 can be operable to detect, survey, monitor, and/or analyze network (e.g., Internet) content of the user devices 140 and is described in further detail below with reference to FIG. 2. The recommendation module 158 can be operable to provide content recommendations for the out-of-home device 110 can is described in further detail below with reference to FIG. 2.

Figure 2:
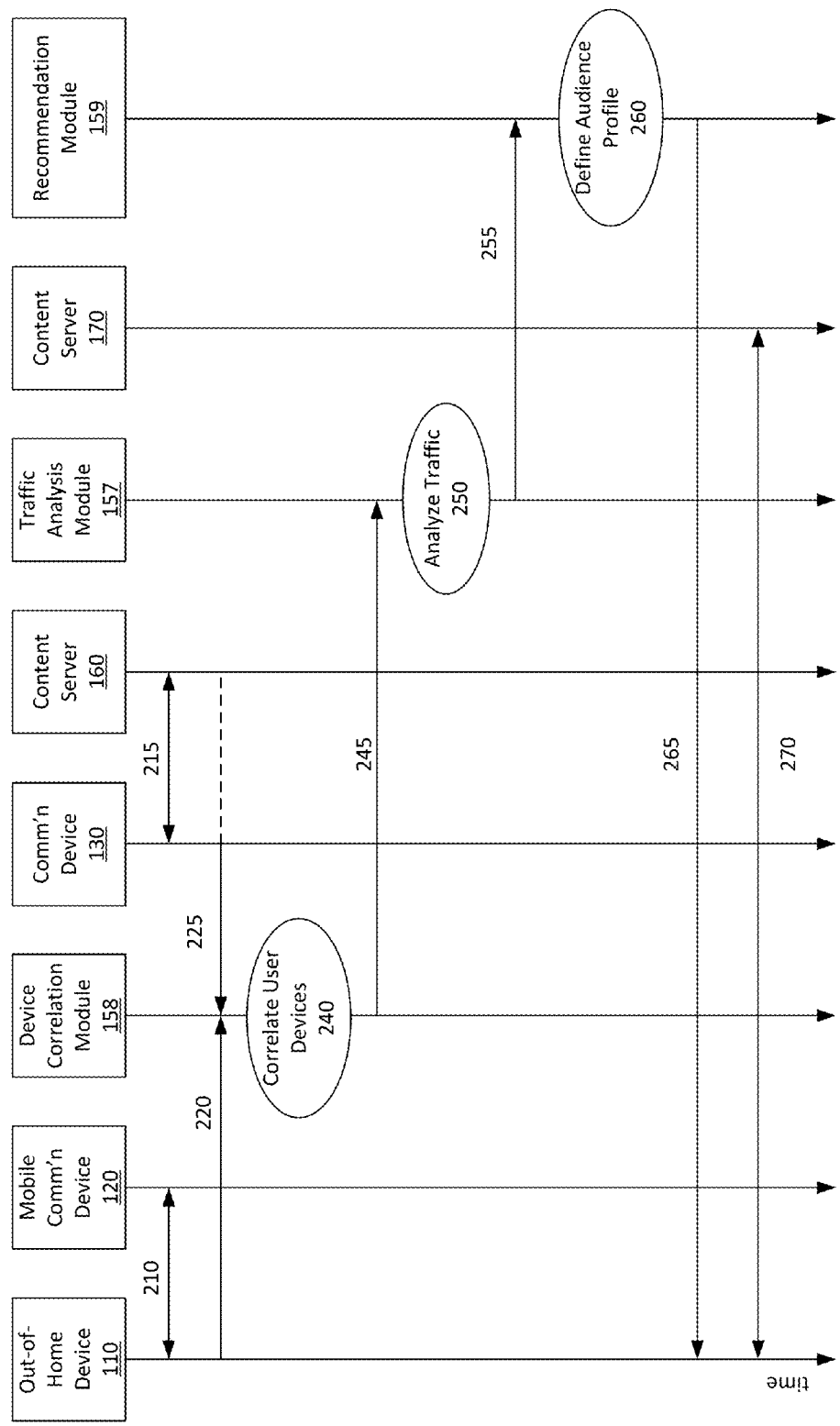
FIG. 2 is a signal diagram for dynamically defining an audience, according to an embodiment.

FIG. 2 is a signal diagram 200 for dynamically defining an audience, according to an embodiment. The signal diagram 200 is described with reference to the out-of-home device 110, the mobile communication device 120, and the communication device 130 of FIG. 1. The signal diagram also includes the device correlation module 158, the traffic analysis module 157, and the recommendation module 159 of the location correlation server 150 of FIG. 1.

A connection is established between the mobile communication device 120 and the out-of-home device 110. Similarly stated, the mobile communication device 120 and/or the out-of-home device 110 can exchange signals 210 associated with, for example, a WiFi connection, the mobile communication device 120 being pinged by a Bluetooth® module of the out-of-home device, or any other suitable connection. The out-of-home device 110 can detect the presence of the mobile communication device 120 when the connection is established. In some instances, the out-of-home device 110 can receive an identifier associated with the mobile communication device 120, such as a MAC address, UUID, and/or so forth. In some instances, such as instances where the out-of-home device 110 provides a WiFi hotspot, the mobile communication device 120 can access the network 190 (e.g., the Internet) via the out-of-home device 110. In such an instance, the out-of-home device can monitor traffic requests from the mobile communication device 120 and/or monitor content delivered to the mobile communication device 120.

The out-of-home device 110 can send a signal 220 including data associated with the mobile communication device 120 to the device correlation module 158. Signal 220 can include, for example, one or more identifiers associated with the mobile communication device 120, one or more identifiers associated with the out-of-home device 110, such as a serial number and/or location data (e.g., obtained via the location module 118, etc.) Similarly stated, signal 220 can represent the out-of-home device 110 reporting communication devices (including the mobile communication device 120) detected nearby, identifiers associated with nearby communication devices, and/or network traffic data associated with nearby communication devices.

In other embodiments, the device correlation module 158 can be operable to receive data associated with the mobile communication device directly from the mobile communication device 120, from the mobile communication device's 120 ISP, from a network location requested and/or accessed by the mobile communication device 120 and/or so forth. Similarly stated, the mobile communication device 120 can report its location and/or content it requested and/or accessed directly to the device correlation module 158 such that signals 210 and/or 220 are not sent. In addition or alternatively, when the mobile communication device 120 requests and/or accesses a network location, mobile communication device's 120 ISP and/or a server associated with the network location can report the mobile communication device's 120 location and/or content accessed by the mobile communication device 120. As an illustration, a user of the mobile communication device 120 can direct the mobile communication device 120 to access a website via a cellular data link. The website and/or the cellular data provider can then send a signal to the device correlation module 158 including the location of the mobile communication device 120 and/or an indication of the website.

The communication device 130 can send signal 215 representing the communication device 130 accessing a content server 160 (not shown in FIG. 1). The communication device 130 accessing the content server 160 can be independent of the out-of-home device 110 establishing a connection with the mobile communication device 120 (e.g., signal 210), and/or the out-of-home device 110 sending signal 220 representing data associated with the mobile communication device 120 to the device correlation module 158. Similarly stated, although signals 210 and 215 are shown in FIG. 2 on the same horizontal line (representing the same time), it should be understood that signals 210 and 215 can occur in any order and signal 210 does not depend on and is not triggered by signal 215 and vice versa.

The content server 160 can be any suitable network (e.g., Internet) content provider, and can be identifiable, for example, by a universal resource locator (URL) and/or IP address. For example, signal 215 can represent a user directing the browser of the communication device 130 to fetch content from a website and/or the content server 160 returning the requested content. In some instances, the content returned by the content server 160 can include a tracking cookie or other suitable traffic monitoring device operable to cause the communication device 130 to send signal 225 to the device correlation module 158. Signal 225 can include one or more identifiers associated with communication device 130 and/or signal 215 (e.g., IP address, cookie data, the URL associated with the content server 160, etc.). In other instances, the content server 160 can send signal 225 reporting traffic activity to the device correlation module 158 (as represented by the dashed portion of signal 225).

The device correlation module 158 can correlate the mobile communication device 120 and the communication device 130 (i.e., the user devices 140), at 240. In some instances, correlating the user devices 140 can be deterministic and can be based on, for example, the user logging into a common account (e.g., email, social networking, etc.) via the mobile communication device 120 and the communication device 130. In some instances, correlating the user devices 140 can be probabilistic and based on, for example, common network traffic patterns, common content consumption patterns, common IP address usage, common location data, and/or any other suitable behavioral indications.

The device correlation module 158 can be operable to associate any number of mobile communication devices with any number of communication devices. Similarly stated, the out-of-home device 110 can survey and/or detect multiple mobile communication devices, each of which can be associated with another communication device(s). By way of example, if fifty mobile communication devices have been detected near the out-of-home device 110, those fifty mobile communication devices can each be linked to one of fifty other communication devices. In other instances, there may not be a 1:1 match. Similarly stated, in some instances, no match may be found for some mobile communication devices and/or some mobile communication devices may be linked to more than one communication device.

U.S. patent application Ser. No. 14/572,418, entitled "System, Methods, and Apparatus for Providing Content to Related Compute Devices Based on Obfuscated Location Data," which is incorporated herein by reference in its entirety, describes some methods of correlating devices in greater detail.

The device correlation module 158 can send signal 245 to the traffic analysis module 157. Signal 245 can include data associated with the user devices 140, such as an indication of the association between the mobile communication device 120 and the communication device 130. Signal 245 can further include an indication of traffic associated with the user devices 140. Alternatively, the traffic analysis module 157 can receive traffic data directly from the mobile communication device 120, the communication device 130, the out-of-home device 110, and or the content server 160. The traffic analysis module 157 can analyze traffic at 250. For example, at 250, the traffic analysis module can perform statistical analyses of the content requested and/or received at 215, and/or any content requested and/or received by the mobile communication device 120 (e.g., via the out-of-home device 110).

In some instances, traffic analysis can include identifying content that is statistically overrepresented based on the location of the mobile communication device 120 and/or the out-of-home device 110. Similarly stated, the traffic analysis module 157 can calculate a score for content associated with the location of the mobile communication device 120 and/or the out-of-home device 110. One example for calculating the score can be ranking the top URLs for the location of the out-of-home device 110. For example, the URLs visited by the user devices 140 and any other devices detected near the out-of-home device (and their associated devices) can be ranked based on visitation frequency. In some instances, this ranking can be normalized using, for example, general web traffic data. In this way, websites that are more likely to be visited by users who have been near the out-of-home device 110 than the general web population can be identified.

In some instances, traffic analysis can be represented as a normalized probability score. For example, a probability of a user device that has been linked a location and/or to the out-of-home device 110 (e.g., at location X) visiting a particular website (e.g., www.foo.com) (e.g., within a pre-determined time period, such as a week, a month, a year, etc.) can be calculated based on traffic patterns. For example, in an instance where fifty mobile communication devices have each been linked to one of fifty communication devices, and five communication devices have visited www-.foo.com (e.g., as reported with signal 225), the probability of a user in the audience of location X (P(foo.com|location X)) visiting www.foo.com can be 10%. This probability can be normalized by dividing by the general population's probability of visiting www.foo.com, which can be expressed as (P|foo.com). The score (S) for foo.com at location X can be represented as:

$$S(foo.com, \text{location } X) = \frac{P(foo.com \mid \text{location } X)}{P(foo.com)} \quad [1]$$

Thus, if two of every one hundred Internet users has visited www.foo.com (e.g., within the pre-determined time period), P(foo.com) can be 2%, and S(foo.com, location X) can be 5, which can represent that the audience of the out-of-home device 110 is five times more likely to visit www.foo.com than the general public.

Similarly, a score (S) can be calculated for arbitrary content and/or scores (S) can be calculated for any location. Similarly stated, although S is shown as a function of foo.com and location X, it should be understood that this is for illustrative purposes only and that, for example, S(bar, location Y) can be calculated based on mobile communication devices observed by an out-of-home device at location Y and survey data indicating a probability of a user of the mobile communication device to visit www.bar.com, watch the "bar" television show, the "bar" YouTube® channel, the "bar" streaming content, receive the "bar" magazine, etc.

The traffic analysis module 157 can send signal 255 to the recommendation module 159. Signal 255 can include an indication of high scoring content for the location of the out-of-home device 110. For example, signal 255 can include an indication of the URLs most statistically over-represented at the location of the out-of-home device 110, as compared to, for example, general web traffic.

The recommendation module 159 can define an audience profile, at 260. For example, based on signal 255, the recommendation module 159 can define demographic and/or contextual profiles for the audience of the location associated with the mobile communication device 120 and/or the out-of-home device 110. For example, if content associated with luxury items is overrepresented in the traffic analysis, the recommendation module 159 can infer that the audience near the out-of-home device 110 is wealthier than average. Similarly, if content associated with sports is over-represented in the traffic analysis, the recommendation module 159 can infer that the audience near the out-of-home device 110 is younger, and/or more active than average.

The recommendation module 159 can also be operable to correlate audience profile to available content and send signal 265 to the out-of-home device 110. In some instances, signal 265 can include a recommendation of the website with the highest score, such that the out-of-home device 110 requests and/or receives the highest scoring website, at 270, from a content server 160 hosting that website. In other instances, the recommendation module 159 can recommend content associated with the audience profile, but not necessarily a high-scoring website. For example, if an audience profile indicates a high concentration of skiers, the recommendation module 159 may determine that the audience of the out-of-home device 110 may be interested in snow reports, extreme sports programming, skiing product announcements, etc. Signal 265 can recommend the out-of-home device 110 display such content, and the out-of-home device 110 can request and/or receive such content, at 270, from a content server 160 hosting such content.

In yet other instances, the recommendation module 159 can identify sponsored content based on the audience. For example, because some out-of-home devices 110 offset the cost of operation by displaying sponsored content and/or product announcements, defining audience profiles, at 260, for a relatively small location and/or relatively small number of users can be an effective way to identify niche audiences and/or to provide highly targeted content and product announcements. As an illustration, if the audience contains a concentration of skiers, ski equipment retailers and/or manufacturers may be willing to pay substantial premiums to display announcements for products and/or services and/or offers to this concentrated target market as compared to, for example, traditional mass media channels, which are likely to reach a much lower concentration of avid skiers.

In addition or alternatively, the content recommended by the recommendation module 159 can be served to the mobile communication device 120 and/or the communication device 130. For example, in an instance where the out-of-home device 110 is operable to provide a network access point, recommended content can be served to the mobile communication device 120 via the out-of-home device 110 when the mobile communication device 120 is connected to the out-of-home device 110. Furthermore, the content server 170 can be operable to serve the recommended content to one or both of the user devices 140 via any other suitable network access point (e.g., other than the out-of-home device 110), such as a cellular data link, a home ISP, etc. based on, for example, an identifier (e.g., a MAC address, UUID, etc.) of the mobile communication device 120. For example, the mobile communication device 120 can report its identifier to the content server 170 when the mobile communication device is connected to the network via a cellular data connection (e.g., via a network gateway other than the out-of-home device 110). The content server 170 can be operable to recognize that the mobile communication device 120 was detected at the location associated with the out-of-home device 110 and select and/or provide the recommended content to the mobile communication device 120 based on the audience profile. Similarly, based on the content server 170 recognizing that the mobile communication device 120 was detected at the location associated with an audience profile indicating an affinity for the content, the recommended content can be provided to the communication device 130 based on the mobile communication device 120 being correlated to the communication device 130.

Figure 3:
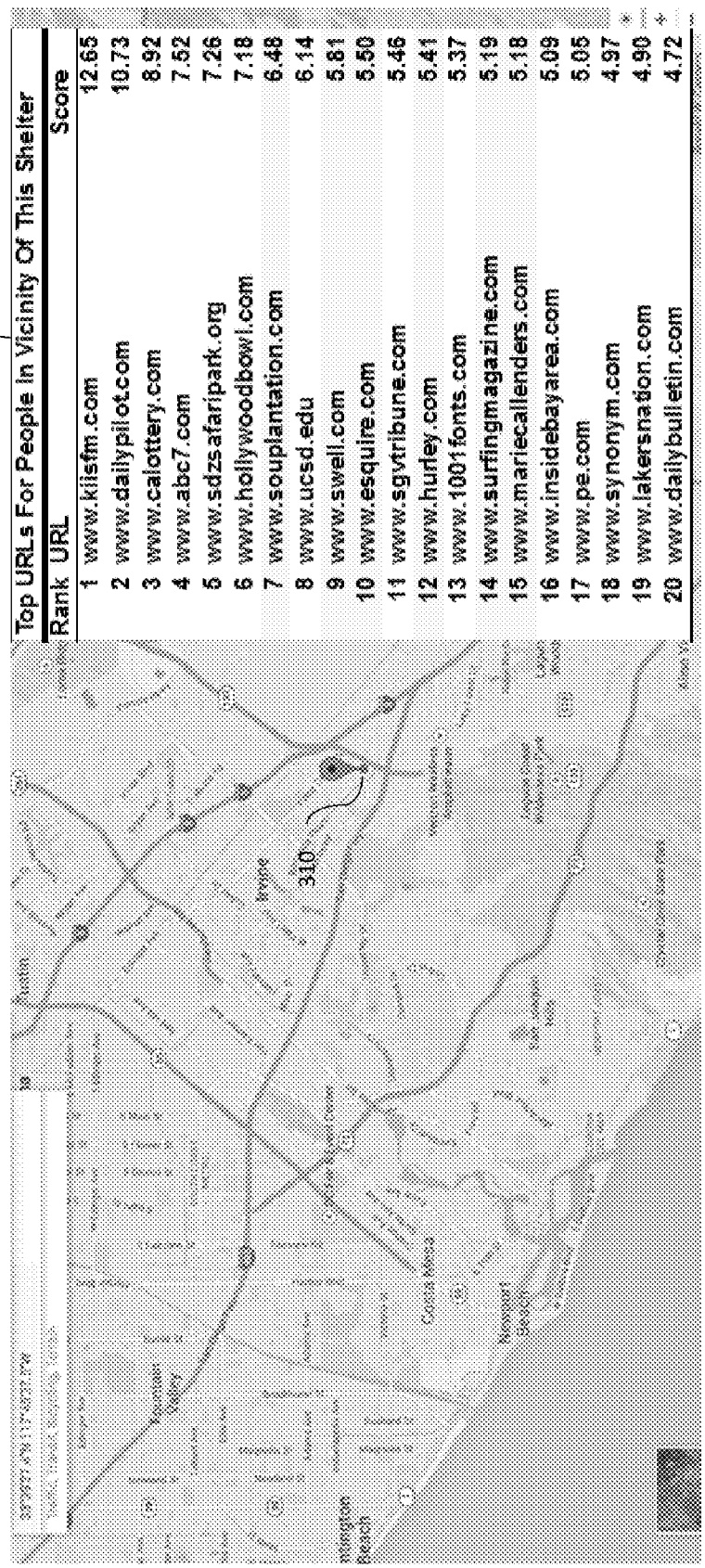
FIG. 3. is a representation of scores for an out-of-home device, according to an embodiment.

FIG. 3. is a representation of scores for an out-of-home device 310, according to an embodiment. FIG. 3 illustrates the location of the out-of-home device 310 in Irvine, Calif. The out-of-home device 310 can be similar to the out-of-home device 110 shown and described above with reference to FIGS. 1 and 2. In this instance, the out-of-home device 310 is a digital canvas on a bus shelter. The out-of-home device 310 can be used to present visual and/or audio content, such as entertainment and/or announcements for products and/or services to individuals while they wait for the bus and/or as they walk by. As described above, the out-of-home device 310 can be operable to detect mobile communication devices of users near the bus shelter. For example, the out-of-home device 310 can offer a WiFi hotspot and/or include a Bluetooth® module operable to survey nearby mobile communication devices. The out-of-home device 310 can report nearby mobile communication devices and/or Internet traffic associated with nearby mobile communication device browsing activity to a location correlation server, which can be operable to link or otherwise associate those mobile communication devices with other communication devices used by the same user(s). In addition or alternatively, mobile communication devices, ISPs, network locations, etc. can report Internet traffic and/or location data associated with the mobile communication devices. The location correlation server 150 can then be operable to filter mobile communication devices 120 that have been reported in a location near the bus stop depicted in FIG. 3 and/or evaluate traffic patterns associated with such mobile devices while such mobile devices are located near the location depicted in FIG. 3 and/or traffic data that occurs away from the location depicted in FIG. 3, but associated with mobile communication devices that have been detected near the location depicted in FIG. 3 within an appropriate time period, such as 1 hour, 12 hours, 3 days, 1 month, etc.

Furthermore, in some instances some or all mobile communication devices 120, such as smart phones detected near the out-of-home device can be linked to one or more communication devices 130, such laptop or desktop computer(s). Linking a smart phone to a laptop or desktop computer can provide additional and/or more meaningful traffic data, because users typically engage in more and/or different browsing behavior on laptops and/or desktops than smart phones.

As described above, the location correlation server can analyze the traffic and calculate scores 350 for content associated with the location. The scores 350 are normalized scores indicating URLs that are overrepresented for the audience of the out-of-home device 310. For example, local radio stations and news sources are overrepresented. Also overrepresented is swell.com, an online surf shop. This may indicate that the area surrounding the bus shelter having the out-of-home device 310 includes a higher proportion of surfers than the general population. Based on this information, swell.com, surf board makers, swimsuit retailers, and/or other outdoor-focused retailers may have an interest in presenting content and/or product and/or service announcements using the out-of-home device 310.

Figure 4:
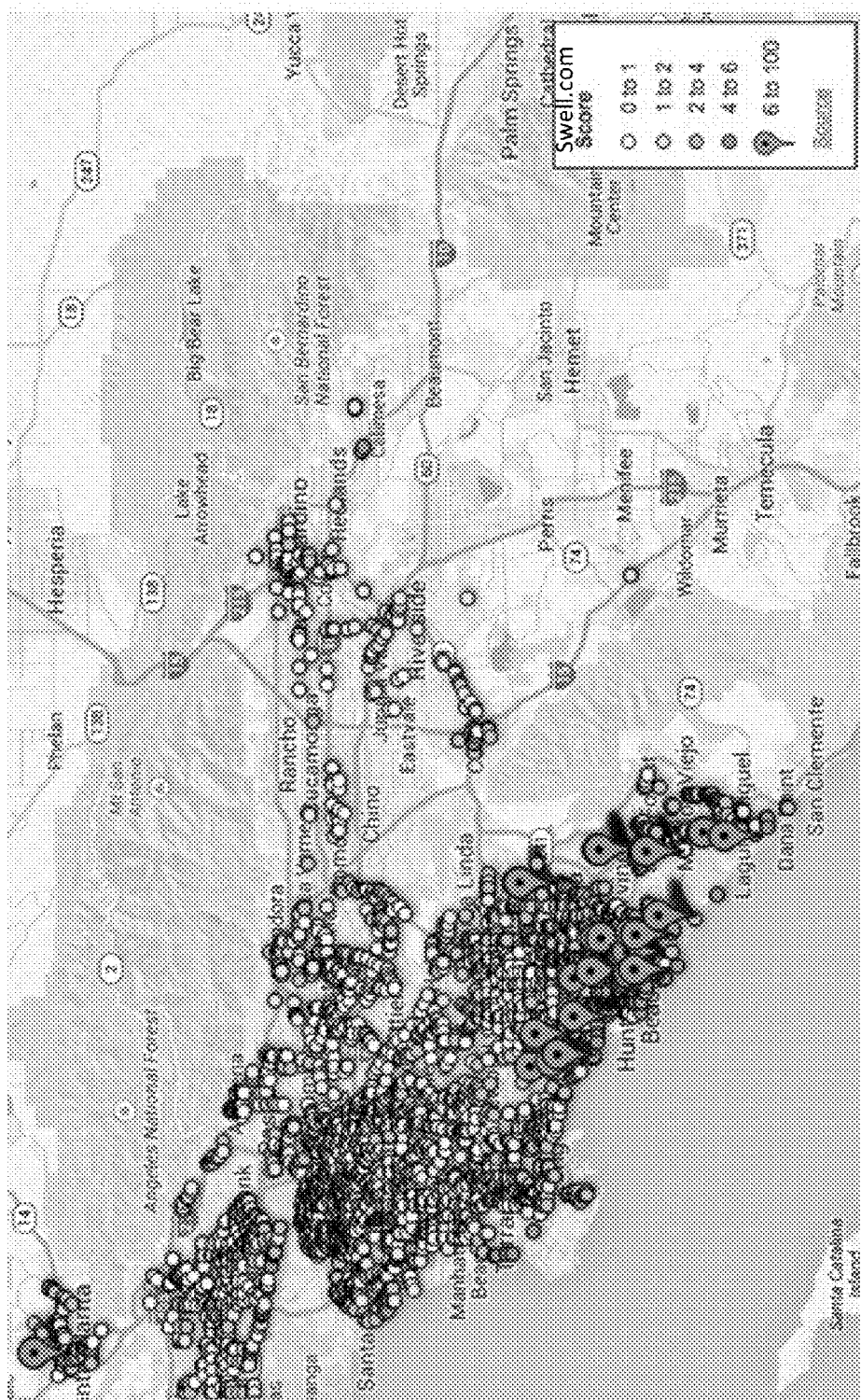
FIG. 4 illustrates out-of-home devices and their associated scores, according to an embodiment.

FIG. 4 illustrates out-of-home devices and their associated scores for swell.com in the Southern Los Angeles metro area. Each dot represents an out-of-home device and the normalized score for the nearby audience for swell.com. As described above, a nearby audience can be, for example, the audience within wireless network range of the out-of-home device. A typical, wireless network range associated with the Institute of Electrical and Electronics Engineers (IEEE) 802.11 standard is approximately 200 feet. Thus, a profile for the audience can be linked to an area of approximately 250,000 square feet. Such highly granular audience profiles can enable extremely localized targeting of content based on interests specific to a very small area. For example, an out-of-home device on a transportation corridor (e.g., street, bus line, train line, etc.) that links a population center to a recreation center such as a beach may have a highly localized increased affinity for surfing. Furthermore, such an affinity may rapidly decrease as the distance from the transportation corridor grows. Similarly stated, a location as little as ½ mile, 2 miles, 5 miles, etc. from the transportation corridor may not have a statistically overrepresented affinity for surfing. Although each dot in FIG. 4 represents an out-of-home device, in other instances, each dot may not represent an out-of-home device, but may simply represent a relatively small location, such as an area of approximately 250,000 square feet.

Furthermore, as illustrated in FIG. 4, such highly localized audience profiles can enable a large number of audience profiles to be defined within a city. Historically, advertisers might target content to an entire city or perhaps a neighborhood, but content consumption based audience profiles for small areas relatively closely spaced (e.g., within ½ mile, within 2 miles, etc.) based on content consumption patterns was not generally feasible. Out-of-home devices, however, can be closely spaced, monitor content in a small area, and be used to produce highly granular audience profiles.

In FIG. 4, the darker dots represent out-of-home devices with local audiences having a greater affinity for surfing. Out-of-home devices indicated with a flag have audiences that are six or more times more likely to have visited swell.com than the general population. A content provider interested in providing information to surfers may be motivated to target these locations. Similarly, an out-of-home device provider may be able to more effectively offset the cost of providing the device by partnering with content providers with an interest in niche audiences overrepresented in that location.

While various embodiments have been described above, it should be understood that they have been presented by way of example only, and not limitation. For example, some embodiments describe location profiles associated with an area of approximately 250,000 square feet. It should be understood that any suitable highly-granular location profile may be constructed. For example, a location profile may be associated with an area of approximately 50,000 square feet, 100,000 square feet, 500,000 square feet, etc.

Where methods described above indicate certain events occurring in certain order, the ordering of certain events may be modified. Additionally, certain of the events may be performed repeatedly, concurrently in a parallel process when possible, as well as performed sequentially as described above. Although various embodiments have been described as having particular features and/or combinations of components, other embodiments are possible having a combination of any features and/or components from any of embodiments where appropriate as well as additional features and/or components.

For example, although some embodiments described herein relate to using an out-of-home device surveying or detecting mobile communication devices and define a profile for the location of the out-of-home device, it should be understood that this is by way of example and not limitation. In other embodiments, audience profiles for any location can be defined based on any suitable device detecting any other suitable device. For example, in some embodiments, a home or business router can detect and/or survey nearby computing entities. Based on detecting a computing entity, a location correlation server can associate the detected computing entity with another computing entity and/or define an audience profile for the location of the router.

For another example, although some embodiments describe an out-of-home device detecting nearby mobile communication devices and defining an audience profile for the location of the out-of-home device based on the detected mobile communication devices, in other embodiments, an audience profile for any location (e.g., a location without an out-of-home device) can be defined based on any suitable data that associates communication devices with locations. For example, in some instances, application (app) developers can receive location information for mobile communication devices executing their app. An audience profile for any location can be defined based on identifying mobile communication devices that have been to an identified location, associating mobile communication devices that have been to the identified location with communication device(s), and/or analyzing the traffic of those mobile communication devices and/or associated communication device(s). This audience profile can be used to, for example, provide custom content and/or product offers to that location via traditional media such as direct mail, billboards, video screens, etc. or used for any other suitable purpose. In addition or alternatively, this audience profile can be used to provide custom content and/or product offers to the identified location via an out-of-home device that may not be operable to identify nearby mobile communication devices.

For another example, where some embodiments describe analyzing traffic, calculating an audience profile, etc., it should be understood that these events can be repeated to, for example update the audience profile over any suitable interval. For instance, an out-of-home device in a mountain resort may have a high proportion of golfers during the summer and a high proportion of skiers in the winter season. For another example, an out-of-home device in a downtown neighborhood may have a high proportion of business people during the day, and a high proportion of nightclub visitors during the night. The methods described herein can be operable to identify changing audience profiles by, for example, calculating audience profiles over suitable time scales (e.g., hourly, weekly, monthly, etc.). Furthermore, audience profiles can be combined across time periods. For example, an audience profile for Tuesdays can be calculated by updating a record of mobile communication devices detected on one Tuesday with mobile communication devices detected the next Tuesday. An audience profile for the 5 o'clock hour can similarly be updated. In this way, the content provided via the out-of-home device can be dynamically updated to match the current audience as determined by detecting and/or making predictions about communication devices that are currently nearby.

As another example, although audience profiles are described as being used to select content for out-of-home devices, in other instances, audience profiles collected via out-of-home devices can be used to perform any suitable audience analysis. For example, if the audience profile for a location changes (e.g., over a one to two year period) to indicate increased interest in craft beers or independent music, this can be indicative that the location is transitioning to a younger and/or hipper neighborhood. Such information can be used to select, for example, where to locate a business catering to younger populations, such as a boutique scarf shop, where to send traditional bulk mail product announcements targeting such an audience, project home value prices, and so forth.

As another example, although some embodiments describe audience profiles being calculated based on traffic patterns of multiple user devices associated with multiple users, in other embodiments, a specific user can be targeted. For example, an out-of-home device can detect a specific user device. A location correlation server can calculate a profile for the specific user of that device, and content can be provided for that one user.

Where methods are described, it should be understood that the methods can stored as code in a non-transitory computer readable medium. Such code can be configured to cause a processor to execute the method and/or cause the processor to bring about an event. Similarly stated, where methods are described, it should be understood that the methods can be implemented by a computer. Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes including for example some or all of the processes and methods described above. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:
1. An apparatus, comprising:
at least one of one or more processors or one or more memories configured to:
receive a network log from an out-of-home device, the network log representing a survey of content consumed by a plurality of mobile communication devices within a wireless transmission range of the out-of-home device,
identify a network location statistically overrepresented in the network log, define an audience profile for a location associated with the out-of-home device based on the network location, receive an indication of network activity associated with a communication device, the communication device not included within the network log received from the out-of-home device;

define an association between the communication device and a first mobile communication device from the plurality of mobile communication devices, and send content to the first mobile communication device based on (1) the association between the communication device and the first mobile communication device, (2) the audience profile for the location, and (3) the network log identifying the mobile communication device as having been within the wireless transmission range of the out-of-home device.

2. The apparatus of claim 1, wherein the at least one of the one or more processors or the one or more memories is configured to send the content to the first mobile communication device via the out-of-home device.

3. The apparatus of claim 1, wherein the at least one of the one or more processors or the one or more memories is configured to receive, from the out-of-home device, an indication of a location associated with the out-of-home device.

4. The apparatus of claim 1, wherein the at least one of the one or more processors or the one or memories is configured to:

receive an indication of general network activity, the general network activity including indications of network activity for a general population and independent of any location, the network location statistically overrepresented in the network log relative to the general network activity such that the network location is specific to the location associated with the out-of-home device.

5. The apparatus of claim 1, wherein the out-of-home device is a digital canvas having a wireless access point, the location is a bus station, the content consumed by the plurality of mobile communication devices within a wireless transmission range of the out-of-home device is consumed via the wireless access point.

6. The apparatus of claim 5, wherein the network log represents a survey of content consumed by a plurality of mobile communication devices while users associated with the plurality of mobile communication devices wait for a bus or walk by the bus stop.

7. The apparatus of claim 1, wherein the at least one or more processors or one or more memories are configured to define the audience profile for the location for a time scale of at least a week.

8. The apparatus of claim 1, wherein the audience profile for the location is for a first time period, the at least one or more processors or one or memories are further configured to:

define an audience profile for the location for a second time period; and combine the audience profile for the location for the first time and the audience profile for the location for the second time to produce a combined audience profile for the location, the content sent to the first mobile communication device based on the combined audience profile for the location.

9. An apparatus, comprising:

at least one or more processors or one or more memories configured to:

receive a network log from an out-of-home device, the network log representing a survey of content consumed by a plurality of mobile communication devices within a wireless transmission range of the out-of-home device, identify a network location statistically overrepresented in the network log, define an audience profile for a location associated with the out-of-home device based on the network location, receive an indication of network activity associated with a communication device;

determine that the communication device and a first mobile communication device from the plurality of mobile communication devices are controlled by a common user based on the indication of network activity associated with the communication device and the network log;

define an association between the communication device and the first mobile communication device send content to the first mobile communication device based on the audience profile for the location and the network log identifying the mobile communication device as having been within the wireless transmission range of the out-of-home device; and send the content to the communication device based on the audience profile for the location and the association between the first mobile communication device and the communication device.

10. The apparatus of claim 9, wherein:

the audience profile is a seasonal profile; and the network log represents a survey of content consumed within a wireless transmission range of the out-of-home device over a season associated with the seasonal profile.

11. A non-transitory processor-readable medium storing code configured to be executed on a processor, the code comprising code configured to cause the processor to:

receive, from an out-of-home device, indications of network activity associated with a plurality of mobile communication devices, the out-of-home device associated with a location;

receive an indication of general network activity, the general network activity including indications of network activity for a general population and independent of any location;

identify a network location statistically overrepresented in the network activity associated with the plurality of mobile communication devices relative to the general network activity;

define an audience profile for the location over a time scale of at least an hour based, at least in part, on the network location; and send content to a user at the location based, at least in part the audience profile for the location.

12. The non-transitory processor readable medium of claim 11, wherein the content is sent to the user via at least one of the out-of-home device, a mobile communication device from the plurality of mobile communication devices, or a communication device associated with the mobile communication device.

13. The non-transitory processor readable medium of claim 11, wherein the general network activity is a representation of all activity on a network that includes the network location.

14. The non-transitory processor-readable medium of claim 11, wherein the content is sent to the out-of-home device.

15. The non-transitory processor-readable medium of claim 11, wherein the user at the location is within two miles of the out-of-home device.

16. The non-transitory processor-readable medium of claim 11, wherein:
the indications of network activity associated with the plurality of mobile communication devices represent network activity accessed via a network access point of the out-of-home device; and
the content is sent to the out-of-home device such that the content is presented on a display of the out-of-home device.

17. The non-transitory processor-readable medium of claim 11, the code further comprising code to cause the processor to:
receive an indication of network activity associated with the communication device;
define an association between the communication device and the mobile communication device based on a similarity of the network activity associated with the communication device and network activity associated with the mobile communication device; and
send the content to the communication device based on the association and the network location.

18. The non-transitory processor-readable medium of claim 17, wherein the network location is not statistically overrepresented in the network activity associated with the communication device.

19. The non-transitory processor-readable medium of claim 11, wherein the location is a first location, the communication device is a first communication device associated with a second location different from the first location, the code further comprising code to cause the processor to:
receive an indication of network activity associated with the first communication device;
define an association between the first communication device and the mobile communication device based on a similarity of the network activity associated with the first communication device to network activity associated with the mobile communication device;
define an audience profile for the second location based, at least in part, on (1) the network location and (2) the association between the first communication device and the mobile communication device; and
send the content to a second communication device associated with the second location based on the audience profile for the first communication device.

20. The non-transitory processor-readable medium of claim 11, the code further comprising code to cause the processor to:
determine an interest associated with the network location, the network location being statistically overrepresented indicating a greater than average concentration of affinity to the interest at the location; and
select the content based on the interest.

21. The non-transitory processor-readable medium of claim 11, wherein the code to cause the processor to define the audience profile includes code to cause the processor to define the audience profile for the location and for a timescale, the indications of network activity associated with the plurality of mobile communication devices being indications of network activity occurring within the timescale.

22. A non-transitory processor-readable medium storing code configured to be executed on a processor, the code comprising code to cause the processor to:
receive, from a plurality of mobile communication devices, signals representing requests to access network locations, each signal received from the plurality of mobile communication devices associated with a common location associated with an out-of-home device;
identify a network location from the network locations as statistically overrepresented;
define an audience profile for the common location over a timescale of at least a week based on the network location, the signals representing requests to access network locations being requests to access network locations within the timescale;
target content to the audience profile such that the content is wirelessly transmitted to a first communication device and a second communication device, the first communication device associated with a first mobile communication device from the plurality of mobile communication devices and the second communication device associated with a second mobile communication device from the plurality of mobile communication devices.

23. The non-transitory processor-readable medium of claim 22, the code further comprising code to cause the processor to:
receive an indication of general network activity, the general network activity including indications of network activity for a general population and independent of any location, the network location that is statistically overrepresented identified based on a comparison between the requests to access network locations received from the plurality of mobile communication devices and the general network activity.

24. The non-transitory processor-readable medium of claim 22, wherein each signal received from the plurality of mobile communication devices is received from the plurality of mobile communication devices within less than 200 feet from the location.

25. The non-transitory processor-readable medium of claim 22, the code further comprising code to cause the processor to:
provide access to a network such that each mobile communication device from the plurality of mobile communication devices can access the network location.

26. The non-transitory processor-readable medium of claim 22, wherein the signals representing requests to access network locations are received via the out-of-home device at the common location.

27. The non-transitory processor-readable medium of claim 22, wherein the communication device and the mobile communication device are controlled by a common user.

* * * * *